Patented May 5, 1931

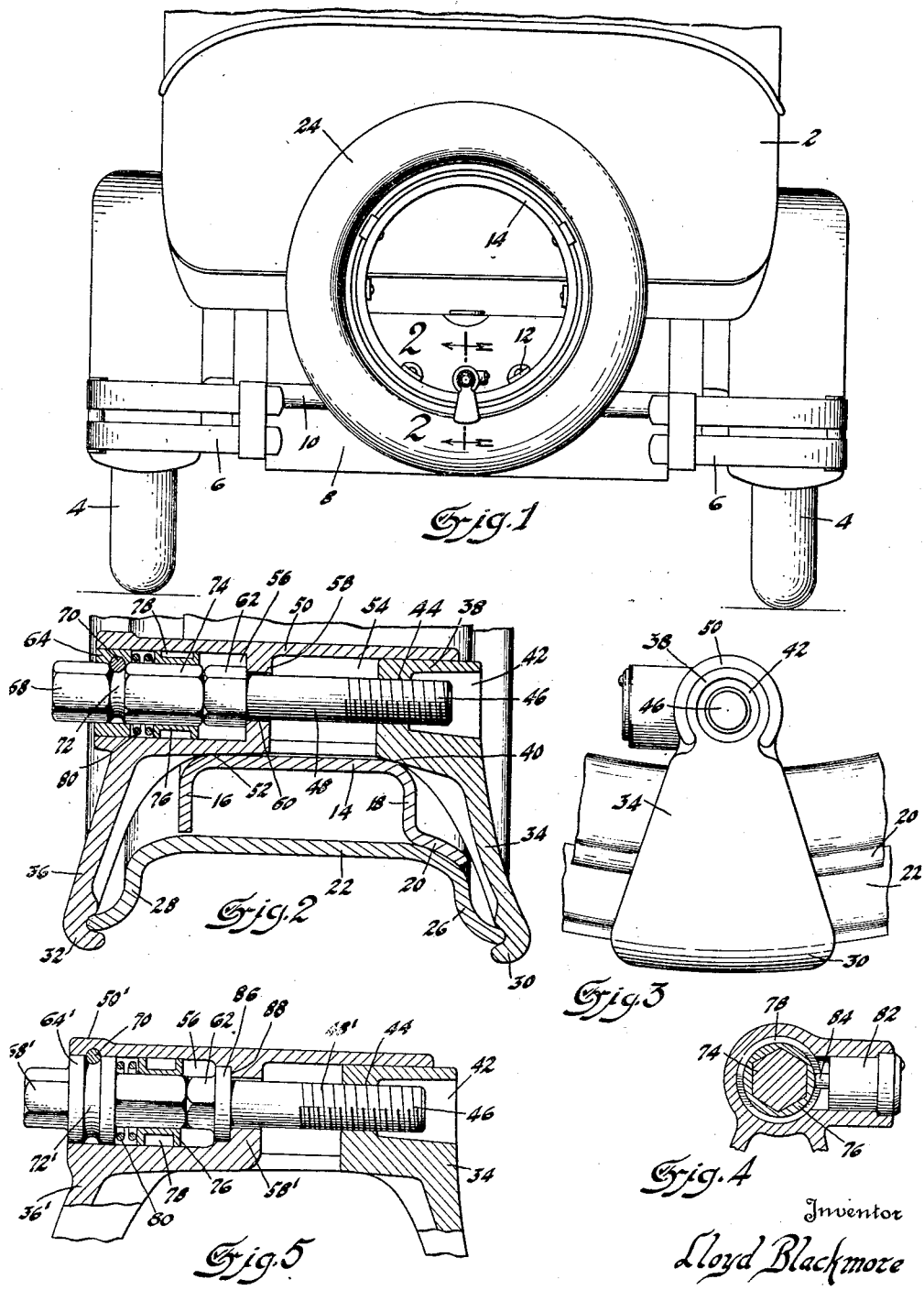

1,803,931

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

SPARE TIRE LOCK

Application filed October 24, 1928. Serial No. 314,622.

This invention relates to locks and has particular reference to a lock for securing the rim of a spare tire on an automotive vehicle.

The automotive vehicle has usually mounted thereon at its rear end a permanent frame adapted to removably receive the tire rim. Suitable clamps are provided to grip the tire rim at one end and they are usually secured together at the opposite ends by means of a bolt. This bolt has been locked or has been prevented from being turned in a number of ways. It is the object of the invention to permanently conceal the operative end of the bolt from view and provide a means to control the bolt by a lock for permitting the operation of the bolt.

The object of the invention is accomplished by providing a pair of clamping arms, one of the ends of which grip the tire and the other ends extend over the permanent rim in juxtaposed relation. One of the arms has a housing having an opening in one wall thereof and through this opening there extends the shank of a bolt which is screwthreaded into the other arm. The head strikes against the wall and is wholly within the housing and is therefore inaccessible. The end of the housing is closed and through the closed end there extends an operating member, the inner end of which abuts the end of the head of the bolt and is similarly shaped. A slidable sleeve is mounted in the housing over the operating member and is spring pressed to force it over the head of the bolt to thereby connect both bolt and operating member and allow a wrench or suitable tool applied to the exposed end of the operating member to operate the bolt. A suitable lock is provided to shift the slide member off the head of the bolt and hold it on the operating member. The operating member will then freely turn in its mounting in the housing and will have no effect on the bolt.

On the drawing:

Fig. 1 shows a rear view of a vehicle with the invention applied thereto.

Fig. 2 is a section on the line 2—2 of Fig. 1 with the tire omitted.

Fig. 3 is an enlarged elevational view of the rear portion of the lock shown in Fig. 2.

Fig. 4 is a sectional view through the locking barrel controlling the sliding member.

Fig. 5 is a view similar to Fig. 2 of a modification.

Referring to Fig. 1, the numeral 2 indicates an automotive vehicle as a whole, the vehicle having the wheels 4, rear quarter bumpers 6, gas tank 8 and rear brace 10 preferably extending from side bar to side bar of the chassis frame. Mounted on the brace 10 by means of suitable brackets 12 is a permanent frame preferably in the form of a ring 14. Instead of the brace 10 the brackets 12 may be mounted on the usual cover plate for the gas tank which extends from one chassis side bar to the other. The frame 14 is provided with the lateral flanges 16 and 18, the latter of which has an annular lip 20 adapted to receive the rim 22 of the tire 24.

The parts so far described are conventional and per se form no part of the invention.

The rim 22 is provided with the flanges 26 and 28 for the purpose of receiving the hook shaped ends 30 and 32 of the clamping arms 34 and 36. The hook shaped ends of the arms 30 and 32 are relatively broad as shown in Fig. 3 in order to give an adequate clamping surface.

The end 38 of the arm 34 extends upwardly and overlaps somewhat the upper portion of the rim 14 as shown at 40. The outer face of the end 38 is preferably hollow as shown at 42, although it may be left solid if desired, and is provided with the threaded opening 44 for the reception of the threaded end 46 of a bolt 48.

The arm 36 also has its upper end 50 extending over the rim 14 and contacting therewith as at 52. The upper end 50 preferably extends entirely across the rim and has its extremity hollowed out as shown at 54 and embracing the end 38 of the arm 34. The end 50 is provided at its outermost end with the housing portion 56, the rear wall 58 of which is provided with an opening 60 adapted to receive the shank of the bolt 48. The head 62 of the bolt seats well within the housing and abuts the wall 58.

In the end of the housing there is rigidly secured the plug or closure 64 which is provided with an opening adapted to receive the operating member 68. In shape, the operating member preferably conforms to the shape of the head of the bolt as is seen in Fig. 2. Passing through suitable openings in the end 50 of the arm 36 and in the plug 64 is a suitable pin 70 rigidly and immovably clamped or wedged in position. The operating member 68 has an annular groove 72 conforming to the pin 70 and in the inter-relation of the parts as shown in Fig. 2, the pin 70 will permit the rotation but not the longitudinal movement of the operating member 68.

Surrounding the inner end 74 of the operating member 68 is a slidable sleeve 76, U-shaped in cross section to provide the groove 78. The shape of the inner circumference of the sleeve conforms to the shape of the operating member and bolt head and a compression coil spring 80 is confined between the plug 64 and the end of the sleeve 76 to constantly urge the sleeve to the right, when considering the structure of Fig. 2. At one side of the end 50 adjacent the sleeve 76, as shown in Fig. 4, there is positioned the locking barrel 82 having an eccentric pin 84 at its end. The eccentric pin is adapted to work in the annular groove 78 of the slidable member 76 to cause it to move from its extreme right hand position to the position shown in Fig. 2.

The operation of the device is as follows: The locked position of the parts is shown in Fig. 2. From a consideration of the parts in the position shown it will be apparent that by turning the operating member 68 no effect will be had on the bolt 48 for the reason that there is no connection between the two, the sleeve 76 being in inoperative position. By now placing the key in the lock and rotating the barrel the pin 84 will be swung around to permit the spring 80 to force the sleeve 76 toward the head of the bolt. In case the inner end 84 of the operating member 68 does not conform precisely to the bolt 62, a rotation of the free end 68 will quickly bring the parts into the proper conformable relation so as to cause the spring 80 to shoot the slide 76 over the bolt head. The rotation of the free end of the operating member 68 will now rotate the bolt 48 to cause the threaded portion 46 to unscrew from the threaded opening 44 and release the clamping arms 34 and 36 from engagement with the tire flanges 26 and 28.

Referring to the structure of Fig. 5 it will be seen that the operating member 68 has been modified and the plug 64 eliminated. Considering the structure of Fig. 5 it will be seen that the operating member 68' is provided with an enlarged portion 64' which is provided with an annular groove 72' and a pin 70 is inserted through suitable openings in the end 50' of the arm 36'.

The bolt 48' in Fig. 5 is also given a special shape in that it is provided with an annular flange 86 which seats in a recess 88 formed in a wall 58' of the housing 56.

The parts are otherwise the same as the structure shown in Fig. 2 and the operation is identical with the operation previously described.

I claim:

1. In a means for securing a tire and its rim to a vehicle, a frame permanently secured to said vehicle and adapted to removably receive said tire rim, means for securing said rim and said frame together including a headed bolt, means for permanently concealing said head including an operating member placed in end to end relation with said bolt head, means on one of said abutting parts and slidable over the other to cause the turning of the bolt through said operating member, and a lock for throwing the parts to inoperative position.

2. The invention of claim 1, said lock operating said last named means.

3. The invention of claim 1, said operating member rotatably but not slidably mounted in said tire lock.

4. The invention of claim 1, said bolt head and operating member having polygonal peripheries and said last named means having a conformably shaped interior.

5. The invention of claim 1, and a spring urging said last named means into engagement with said abutting parts.

In testimony whereof I affix my signature.

LLOYD BLACKMORE.